H. Keys,

Apple Parer,

No. 1,513, Reissued July 21, 1863.

N. PETERS, PHOTO-LITHOGRAPHER, WASHINGTON, D. C.

UNITED STATES PATENT OFFICE.

JOHN H. LOCKEY AND WILLIAM M. HOWLAND, OF LEOMINSTER, MASSACHUSETTS, ASSIGNEES OF HORATIO KEYES, OF SAME PLACE.

IMPROVED APPLE-PARING MACHINE.

Specification forming part of Letters Patent No. 16,240, dated December 16, 1856; Reissue No. 1,513, dated July 21, 1863.

*To all whom it may concern:*

Be it known that we, JOHN H. LOCKEY and WILLIAM M. HOWLAND, both of Leominster, in the county of Worcester and State of Massachusetts, have, by assignment duly recorded in the Patent Office, become the sole owners of a certain new and Improved Machine for Paring Apples and other Fruits and Vegetables, for which Letters Patent of the United States were granted to H. KEYES, of said Leominster, and we do hereby declare that the following is a full, clear, and exact description of said invention, reference being had to the accompanying drawings, forming a part of this specification, in which—

Figure 1:
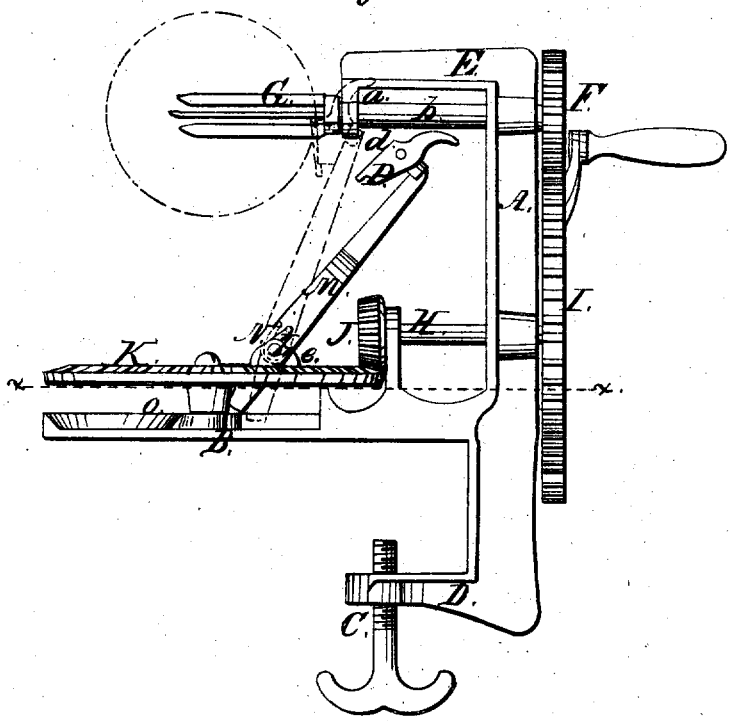
Figure 2:
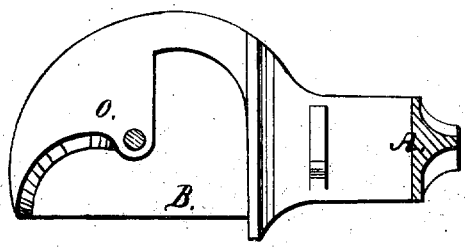

Figure 1 represents a side elevation of the improvement. Fig. 2 is a horizontal section of the same, the line *x x*, Fig. 1, indicating the plane of section.

Similar letters of reference in both views indicate corresponding parts.

This invention consists in attaching the knife-head to a rotating disk or wheel arranged in such a way that the knife is allowed to pass around the apple or other article to be pared, thereby preventing or obviating the necessity of any backward or retrograde movement of the knife; also, in combining the disk or turntable to which the knife head is attached with the shank of said knife-head and with a cam in such a manner that by the relative position of the disk and cam toward each other the position of the knife-head is governed, and particularly in throwing and holding the knife-head back clear of the apple or other article pared till it resumes its original position where it commences paring.

To enable those skilled in the art to make and use this invention, we will proceed to describe it.

A represents an upright to which a horizontal plate, B, is attached, and C is a screw which passes through a horizontal bar, D, attached to the lower end of the upright A. The upright is secured to the edge of a table or bench by means of the screw C.

The upper end of the upright A has a short horizontal bar, E, attached to it, and this bar has a pendent bearing, *a*, at its outer end to receive a shaft, *b*, said shaft passing through the upper end of the upright A, and having a pinion, F, on its end adjoining the upright. The opposite end of the shaft *b* has a fork, G, attached to it, on which fork the apple or other article to be pared is placed.

H is a shaft which passes through the upright A just above the plate B. This shaft has a toothed-wheel, I, attached to it adjoining the upright, and the wheel I gears into the pinion F. The opposite end of the shaft H has a bevel-pinion, J, upon it, and this pinion gears into a horizontal wheel, K, the axis of which is attached to the plate B.

L represents a small shaft which is fitted in bearings *c c*, attached to the upper surface of the wheel K. This shaft is placed at one side of the center or axis of the wheel K, and has an upright arm, M, attached to it. The shaft L also has a spiral spring, N, around it. One end of this spring is attached to the wheel K, and the other end is attached to the lower end of the arm M. The lower end of the arm M passes down through the wheel K, and bears against a cam, O, which is formed on the upper surface of the plate B. The shape of this cam is distinctly shown in Fig. 2.

To the upper end of the arm or shank M a head or stock, P, is attached, and the knife *d* is secured in this head or stock. The knife-head or stock and the knife are of the usual construction.

From the above description of parts it will be seen that as the wheel I is rotated a rotary motion will be communicated to the fork G, and also to the wheel K, and the knife-head P will consequently pass around the fork G in a circle. The knife is made to bear against the apple at one side by means of the spring N, and as the knife passes round at the opposite side it is kept thrown out from the apple in consequence of the lower end of the arm or shank M bearing against the cam O.

When the knife-head is thrown out by the cam O, the apple that may have been pared can be removed from the fork and replaced by another, and in this position the head is allowed to pass underneath the shaft, *b*, as clearly shown in Fig. 1 of the drawings.

What we claim as new, and desire to secure by Letters Patent, is—

1. Giving the knife a circular movement around the fork G and apple or other article thereon, substantially in the manner and for the purposes shown and described.

2. The combination of the wheel or turn-table K, cam O, and shank M of the knife-head P, constructed and operating in the manner and for the purpose substantially as herein set forth.

JOHN H. LOCKEY,
WM. M. HOWLAND.

Witnesses:
C. H. MERRIAM,
C. N. PIERCE.